United States Patent Office 3,022,254
Patented Feb. 20, 1962

3,022,254
LIQUID DIENE POLYMER-OLEFIN/SO₂ COMPOSITION AND PREPARATION OF THERMOSET CELLULAR PRODUCT THEREFROM
Rufus V. Jones and John N. Scott, Jr., Bartlesville, Okla., assignors to Phillips Petroleum Company, a corporation of Delaware
No Drawing. Filed May 22, 1957, Ser. No. 660,754
9 Claims. (Cl. 260—2.5)

This invention relates to thermoset cellular products from liquid diene polymers.

It is known that liquid conjugated diene polymers such as liquid polybutadiene will form thermoset solid resins when the polymers are heated, and that these resins are thermally stable at relatively high temperatures, whereas some other resins, e.g., polystyrene, pyrolyze at lower temperatures.

It has now been found that if a blowing agent is blended with a liquid conjugated diene polymer, such as liquid polybutadiene or a butadiene/styrene copolymer, and the mixture heated, the blowing agent will decompose with accompanying evolution of gas simultaneously with the setting up of the liquid polymer, and there will result a thermoset cellular solid product. Heating can be readily effected under the conditions which are optimum for the formation of a desirable product during the setting or curing process. Foamed products from liquid polybutadiene will withstand high temperatures and they find application as insulating materials for equipment operating at high temperatures such as reactors, fractionating columns, and the like.

The following are objects of our invention.

An object of our invention is to provide cellular thermoset resinous products prepared from diene polymers. A further object of our invention is to provide a composition curable to a cellular thermoset resin. A further object of our invention is to provide a method of preparing cellular thermoset resins.

Other objects and advantages of our invention will become apparent to one skilled in the art upon reading the accompanying disclosure.

Various blowing agents are used in carrying out the invention. In general, these agents comprise materials which decompose at the temperatures employed in preparing the cellular product and yield gaseous products or components which react with other ingredients present to produce gaseous products. Among the materials which are suitable for this purpose are p,p'-oxy-bis(benzenesulfonylhydrazide) which is sold under the trade name of Celogen by Naugatuck Chemical, a division of the United States Rubber Company; diazoaminobenzene, dinitrosopentamethylenetetramine, 4-nitrobenzene sulfonic acid hydrazide, beta-naphthalene sulfonic acid hydrazide, diphenyl-4,4'-di(sulfonyl azide), and mixtures of materials such as sodium bicarbonate with a solid acid such as tartaric acid. The amount of blowing agent employed varies, but usually is in the range of between about 0.01 and about 40 parts by weight per 100 parts of the liquid polymer.

The cellular material is prepared over a relatively wide range of temperature conditions, which depend principally on the blowing agent selected. Generally, the temperature employed varies between about 350° F. and about 550° F.

Another group of blowing agents are olefin-SO₂ resins, known in the art as polysulfone resins. Such resins can be blended with the liquid diene polymers and will decompose at the temperature required to set or cure the liquid diene polymers.

The liquid conjugated diene polymers employed in this invention include both homopolymers and copolymers, i.e., a conjugated diene may be polymerized alone, with one or more conjugated dienes, or with one or more other copolymerizable materials. When copolymers are prepared, at least 50 weight percent of the monomers charged to the polymerization reaction should be conjugated dienes. The preferred conjugated dienes are those which contain from 4 to 6 carbon atoms per molecule. Examples of such conjugated dienes include 1,3-butadiene, isoprene, piperylene, methylpentadiene, 2,3-dimethyl-1,3-butadiene, and the like. Of the conjugated dienes which are applicable, butadiene is most generally used. Monomers copolymerizable with conjugated dienes include styrene, alpha-methylstyrene, alpha-methyl-p-methylstyrene, halogenated styrenes such as 2-chlorostyrene, and 3-bromostyrene, acrylonitrile, methacrylonitrile, acrylic and methacrylic acid esters such as methyl acrylate and methyl methacrylate, vinylpyridines such as 2-vinylpyridine, 2-methyl-5-vinylpyridine, etc.

The liquid polymers can be prepared by any method known in the art. They are most frequently prepared by alkali metal catalyzed polymerization but can also be prepared by emulsion polymerization. One method for preparing liquid polymers is disclosed in U.S. 2,631,175, issued March 10, 1953, to Willie W. Crouch. Another method which employs hydrofluoric acid as the catalyst is disclosed in U.S. 2,550,659, issued May 1, 1951, to J. C. Hillyer and J. F. Wilson. The liquid polymers generally have a viscosity in the range between 100 and 6000 Saybolt Furol seconds at 100° F. The liquid conjugated diene polymers can be used as originally prepared; they may be steam stripped or stripped by flushing with an inert gas such as nitrogen, as is disclosed in the copending application of Crouch et al., filed January 20, 1955, Serial No. 483,162, now Patent No. 2,826,565; or they may be extracted with a liquefied hydrocarbon gas such as liquefied propane as is disclosed in a copending application of Wheelock, filed January 31, 1955, Serial No. 485,050.

The polysulfone resins utilized in the production of the cellular products herein described are obtainable by the copolymerization of sulfur dioxide and an unsaturated compound such as an open-chain monoolefin, a diolefin, an acetylenic compound, or an unsaturated nitrile. Such resins are producible by methods known in the art such as copolymerization in the presence of any one of a large number of catalytic materials such as oxygen, hydrogen, peroxide, ozone, various nitrates such as silver, lithium nitrates, persulfates, chlorates, perchlorates, etc. The reaction may be effected in the dark or in the light. Polysulfone resins may also be produced by the emulsion polymerization method as set forth in U.S. 2,645,631, issued July 14, 1953, to Crouch and Cotten. Although a wide variety of unsaturated compounds can be used to produce the polysulfone resins, an especially satisfactory material is an open-chain monoolefin. The monoolefin used preferably contains from 3 to 12 carbon atoms per molecule. Monoolefins can be used in the pure state or as commercial available mixtures such as refinery cuts. Examples of suitable olefins are 1-butene, 2-butene, propylene, pentenes, hexenes, heptenes, octenes, and decenes.

The polysulfone resins can be conveniently employed in the form of a powder which can be easily blended with the liquid conjugated diene polymer. The mixture is then heated to produce the desired cellular product. The amount of polysulfone resin used is generally in the range between 0.01 and 15 weight percent, preferably between 1 and 10 weight percent, based on the liquid conjugated diene polymer. Larger amounts, of course, can be used.

Heating of the polysulfone resin-liquid conjugated diene polymer blend must be effected at a temperature at which the liquid conjugated diene polymer will gel readily in order that the gas produced by decomposition of the polysulfone resin will be retained.

The curing or heating time will generally vary in the range between 15 minutes and 10 hours. It will depend upon the nature of the product desired. The strength and hardness increase with an increase in curing time. More flexible or rubbery products are obtained with a shorter curing time.

The products of this invention are particularly applicable for insulating materials, especially insulation foamed in place. The blend of liquid conjugated diene polymer and blowing agent can be prepared and poured into the area to be insulated and the cellular insulation produced in place by elevating the temperature to the required level. Other applications for the cellular products herein described are in mats, cushions, and various molded objects, both rigid and flexible. Obviously, it is possible to incorporate fillers, reinforcing agents, pigments, dyes, etc. in the compositions of our invention.

*Example I*

Liquid polybutadiene, prepared by mass polymerization using finely divided sodium as the catalyst, and having a viscosity of 1362 Saybolt Furol seconds at 100° F., and a Gardner color of 11, was stripped in a batch operation by vigorous flushing of nitrogen through the polymer. The polymer for this operation was charged to a pot and heated in an oil bath which had a temperature of 380 to 400° F. The pot was evacuated to 10 to 20 mm. Hg and the pressure was maintained at this level while nitrogen was flushed through the polymer over a 45-minute period.

Ten parts by weight of the liquid polybutadiene was blended by stirring with 0.5 part by weight of powdered 1-butene-$SO_2$ resin and the mixture was heated in an open vessel in an oven at 500° F. for 30 minutes. A 300 percent increase in volume occurred. The cellular product was soft and rubbery.

The polysulfone resin was prepared by polymerizing 1-butene and sulfur dioxide in aqueous emulsion in accordance with the following recipe:

| | Parts by weight |
|---|---|
| 1-butene | 46.7 |
| $SO_2$ | 88.3 |
| Sodium alkyl sulfate [1] | 2.0 |
| Ammonium nitrate | 1.0 |
| Water | 180 |

[1] Maprofix MM, Onyx Oil and Chemical Company.

Polymerization was effected in a one-gallon stainless steel autoclave provided with a stirrer. The sodium alkyl sulfate, ammonium nitrate, and water were charged first, the reactor was closed, 1-butene was added, and then the $SO_2$. The mixture was stirred (stirring rate, 220 r.p.m.) and the temperature was maintained at 94 to 102° F. for 5 hours after which the reactor was vented. The latex had a solids content of 34.8 weight percent. The polymer was coagulated with methanol, filtered and dried. A conversion of 98.5 percent of the 1-butene was obtained.

When the liquid polybutadiene was heated alone in an oven at 500° F. for 30 minutes, a very slight increase in volume was observed. The product was a rubbery, gelled polymer.

*Example II*

Ten parts by weight of the liquid polybutadiene of Example I was blended with 0.5 part by weight of nitrogen blowing agent which decomposes at 356 to 410° F. p,p'-oxy-bis-(benzenesulfonylhydrazide). The mixture was heated in an open vessel in an oven at 500° F. for 30 minutes as in the preceding runs. An increase in volume of approximately 100 percent was observed and a soft, rubbery product resulted.

*Example III*

1-pentene and sulfur dioxide were polymerized in aqueous emulsion in accordance with the following recipe:

| | Parts by weight |
|---|---|
| 1-pentene | 52.2 |
| $SO_2$ | 82.8 |
| Sodium alkyl sulfate [1] | 2.0 |
| Ammonium nitrate | 0.5 |
| Water | 180 |

[1] As in Example I.

Polymerization was effected in a five-gallon glass-lined reactor provided with a stirrer. The sodium alkyl sulfate, ammonium nitrate, and water were charged, the reactor was closed, the 1-pentene was added, and then the $SO_2$. The mixture was stirred and maintained at a temperature of 95 to 101° F. for 7 hours after which the reactor was vented. The latex had a solids content of 32.4 weight percent. The polymer was coagulated at 23° C. with methanol. Water was added and the mixture was heated to flocculate the polymer which was then filtered and dried. A conversion of 98.4 percent of the 1-pentene was obtained.

The 1-pentene-$SO_2$ resin in powdered form was blended by stirring 0.5 part by weight thereof with 10 parts by weight of the liquid polybutadiene described in Example I. The mixture was heated in an open vessel in an oven at 500° F. for 30 minutes. The composition increased in volume 300 percent to give a soft, rubbery product which had a uniform cell structure.

*Example IV*

Twenty parts by weight of the liquid polybutadiene described in Example I was blended with one part by weight of powdered 1-pentene-$SO_2$ resin and the mixture was heated in an open vessel at 475° F. for 1.5 hours. A 100 percent increase in volume occurred. The cellular product was rubbery.

*Example V*

Twenty parts by weight of the liquid polybutadiene described in Example I was blended with two parts by weight of powdered 1-pentene-$SO_2$ resin. The mixture was heated in an open vessel at 475° F. for 1.5 hours to give an increase in volume of 200 percent. A rubbery cellular product was obtained.

*Example VI*

A liquid copolymer prepared by mass polymerization of 85 parts by weight of 1,3-butadiene and 15 parts by weight of styrene in the presence of finely divided sodium when blended with 5 weight percent of a 1-butene-$SO_2$ resin and heated in an open vessel at 475° F. produces a cellular product of over 100 percent increase in volume.

As many possible embodiments can be made of this invention without departing from the scope thereof, it is to be understood that all matter herein set forth is to be interpreted as illustrative and not as unduly limiting the invention.

We claim:

1. A composition curable to a cellular thermoset solid resin upon heating at a temperature in the range of 450 to 550° F. in the absence of a sulfur vulcanizing agent comprising a polymer of a conjugated diene containing 4 to 6 carbon atoms having a viscosity of 100 to 6000 Saybolt Furol seconds at 100° F. and an olefin/$SO_2$ resin, the amount of said resin being in the range of 0.01 to 15 weight percent based on the liquid polymer.

2. A composition curable to a cellular thermoset solid resin upon heating at a temperature in the range of 450 to 550° F. in the absence of a sulfur vulcanizing agent comprising a 1,3-butadiene/styrene polymer having a viscosity of 100 to 6000 Saybolt Furol seconds at 100° F. and an olefin/$SO_2$ resin, the amount of said resin being in the range of 0.01 to 15 weight percent based on the liquid polymer.

3. A composition curable to a cellular thermoset solid resin upon heating at a temperature in the range of 450 to 550° F. in the absence of a sulfur vulcanizing agent comprising polybutadiene having a viscosity of 100 to 6000 Saybolt Furol seconds at 100° F. and a 1-butene-$SO_2$ resin, the amount of said resin being in the range of 0.01 to 15 weight percent based on the liquid polybutadiene, and recovering a thermally cured product.

4. A composition curable to a cellular thermoset solid resin upon heating at a temperature in the range of 450 to 550° F. in the absence of a sulfur vulcanizing agent comprising polybutadiene having a viscosity of 100 to 6000 Saybolt Furol seconds at 100° F. and a 1-pentene-$SO_2$ resin, the amount of said resin being in the range of 0.01 to 15 weight percent based on the liquid polybutadiene.

5. A method of preparing a cellular thermoset solid resin comprising mixing polybutadiene having a viscosity of 100 to 6000 Saybolt Furol seconds at 100° F. with an olefin/$SO_2$ resin, the amount of said resin being in the range of 0.01 to 15 weight percent based on the liquid polybutadiene, heating the resulting mixture at a temperature in the range of 450 to 550° F. for a time in the range of 15 minutes to 10 hours, said heating serving to blow and set said liquid polybutadiene and recovering a thermally cured product.

6. A method of preparing a cellular thermoset solid resin comprising mixing liquid polybutadiene having a viscosity of 100 to 6000 Saybolt Furol seconds at 100° F. with an olefin/$SO_2$ resin, the amount of said resin being in the range of 1 to 10 weight percent based on the liquid polybutadiene, heating the resulting mixture at a temperature in the range of 450 to 550° F. for a time in the range of 15 minutes to 10 hours, said heating serving to blow and set said liquid polybutadiene, and recovering a thermally cured product.

7. A method of preparing a cellular thermoset solid resin comprising mixing liquid polybutadiene having a viscosity of 100 to 6000 Saybolt Furol seconds at 100° F. with a 1-butene-$SO_2$ resin, the amount of said resin being in the range of 0.01 to 15 weight percent based on the liquid polybutadiene, heating the resulting mixture at a temperature in the range of 450 to 550° F. for a time in the range of 15 minutes to 10 hours, said heating serving to blow and set said liquid polybutadiene, and recovering a thermally cured product.

8. A method of preparing a cellular thermoset solid resin comprising mixing liquid polybutadiene having a viscosity of 100 to 6000 Saybolt Furol seconds at 100° F. with a 1-pentene-$SO_2$ resin, the amount of said resin being in the range of 0.01 to 15 weight percent based on the liquid polybutadiene, heating the resulting mixture at a temperature in the range of 450 to 550° F. for a time in the range of 15 minutes to 10 hours, said heating serving to blow and set said liquid polybutadiene, and recovering a thermally cured product.

9. A method of preparing a cellular thermoset resin comprising mixing a polymer of a conjugated diene containing 4 to 6 carbon atoms having a viscosity of 100 to 6000 Saybolt Furol seconds at 100° F. with an olefin/$SO_2$ resin, the amount of said resin being in the range of 0.01 to 15 weight percent based on said polymer of a conjugated diene containing 4 to 6 carbon atoms, heating the resulting mixture at a temperature in the range of 450 to 550° F. for a time in the range of 15 minutes to 10 hours, said heating serving to blow and set said polymer and recovering a thermally cured product.

References Cited in the file of this patent

UNITED STATES PATENTS

| | | |
|---|---|---|
| 1,901,045 | Schmidt | Mar. 14, 1933 |
| 2,184,295 | Frey et al. | Dec. 26, 1939 |
| 2,552,065 | Schoene | May 8, 1951 |
| 2,610,157 | Gluesenkamp | Sept. 9, 1952 |
| 2,625,525 | Lynch | Jan. 13, 1953 |
| 2,683,696 | Muller et al. | July 13, 1954 |
| 2,688,009 | Crouch et al. | Aug. 31, 1954 |
| 2,788,333 | Lewis et al. | Apr. 9, 1957 |
| 2,797,210 | Burke | June 25, 1957 |
| 2,826,565 | Crouch et al. | Mar. 11, 1958 |

FOREIGN PATENTS

| | | |
|---|---|---|
| 331,197 | Great Britain | June 24, 1930 |

OTHER REFERENCES

Piotrovskii: "Rubber Chem. and Techn.," volume 24, pages 916–920, 1951.

UNITED STATES PATENT OFFICE
CERTIFICATE OF CORRECTION

Patent No. 3,022,254                 February 20, 1962

Rufus V. Jones et al.

It is hereby certified that error appears in the above numbered patent requiring correction and that the said Letters Patent should read as corrected below.

Column 5, line 10, strike out ", and recovering a thermally cured product".

Signed and sealed this 19th day of June 1962.

(SEAL)
Attest:

ERNEST W. SWIDER
Attesting Officer

DAVID L. LADD
Commissioner of Patents